United States Patent
Itzkan

[11] 3,713,044
[45] Jan. 23, 1973

[54] N₂ PUMPED TUNABLE DYE LASER
[75] Inventor: Irving Itzkan, Boston, Mass.
[73] Assignee: The United States of America as represented by the Secretary of the Air Force
[22] Filed: May 17, 1972
[21] Appl. No.: 254,137

[52] U.S. Cl. ................................................331/94.5
[51] Int. Cl. ..................................................H01s 3/20
[58] Field of Search ......................331/94.5; 330/4.3

[56] References Cited

OTHER PUBLICATIONS

Capelle et al., Tuned Nitrogen Laser Pumped Dye Laser. Applied Optics, Vol. 9, No. 12 (Dec. 1970) pp. 2742–2745.

Sousa et al., A New Tuning Method for Dye Lasers. Rev. Sci. Instr., Vol. 42, No. 11 (Nov. 1971) pp. 1736 and 1737.

Primary Examiner—William L. Sikes
Attorney—Harry A. Herbert, Jr. et al.

[57] ABSTRACT

An N₂ pumped tunable dye laser apparatus having an oscillator dye cell located within an optical cavity comprising a grating in a Littrow configuration and a mirror. A second pulsed laser pumps an amplifier dye cell which is not surrounded by any optical cavity. The oscillator dye cell and the amplifier dye are aligned and synchronized so that the amplifier cell will reproduce the photon output of the oscillator dye cell in both frequency and transverse phase.

3 Claims, 1 Drawing Figure

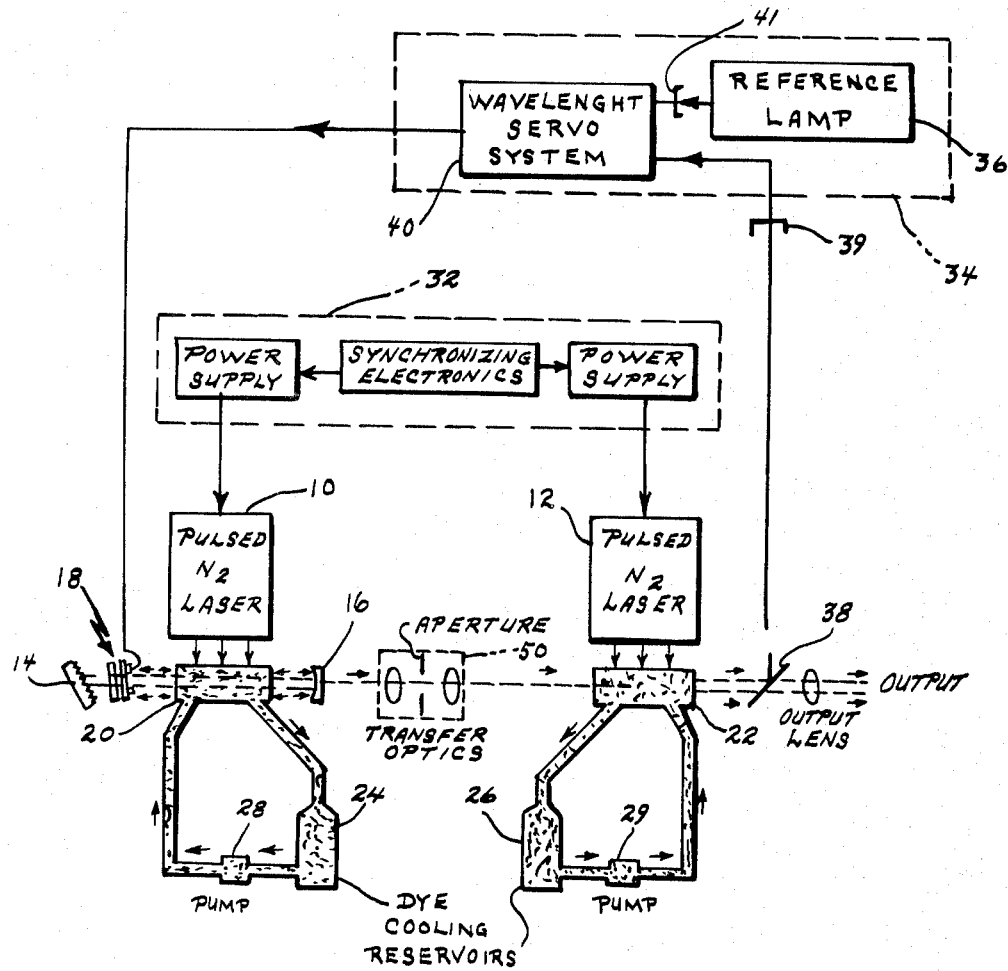

N₂ PUMPED TUNABLE DYE LASER

BACKGROUND OF THE INVENTION

The present invention relates broadly to a pumped oscillator laser system and in particular to a high brightness N₂ pumped tunable dye laser apparatus.

In the field of laser systems, the measure of the utility of a laser device is generally brightness. In the operation of a laser system, it is desirable, either to focus the laser device into a spot as small as possible with a maximum power density at the focus, or to propagate the laser beam for the longest distance with a maximum total transmission power. In either case, the parameter which determines how well this may be accomplished is spatial brightness. Spatial brightness is defined as the power per unit area per unit solid angle in the laser beam. For a diffraction limited laser beam, this quantity is $P/\lambda^2$ watts/m²- ster, where P is the power in the beam and $\lambda$ is the wavelength in meters. For a laser beam which is N times diffraction limited the brightness is $P^2/N^2 \lambda^2$. For such a laser beam, the highest power density that can be achieved at an optical focus is decreased by $1/N^2$ and the best divergence angle that can be achieved is increased by a factor of N.

It is customary to attempt to improve the spatial brightness of a laser by operating only in the lowest order transverse mode. This is accomplished through the use of mode control aperatures which is either internal or external to the laser, and by using a suitable optical cavity, such as an unstable resonator. Single lowest order mode operation approaches diffraction limited operation. These schemes often, although not necessarily, cause a decrease in the output power of the laser. If the decrease is as drastic as $1/N^2$, no net improvement in brightness is achieved.

When it is desired to use the laser to interact with a resonant system, then in addition to the above requirements, high spectral brightness is required. This is the spatial brightness per unit frequency interval, which is sometimes expressed in watts/m²-ster-A., and is a measure of the useful brightness, that is, how much of the laser power can interact with the resonant system. In order to achieve high spectral brightness, various intra-cavity or extra-cavity wavelength selecting techniques have been utilized. These techniques may also cause a decrease in the output power of the laser. Similarly, if the decrease in bandwidth is more than offset by the decrease in power, no net gain is achieved, and in fact a new difficulty may be added, that of precise wavelength tuning control.

Whether it is desired to improve the spectral brightness, the spatial brightness or both, a technique for restoring the full power after improvement, is to utilize an oscillator-amplifier system. In this case, the frequency narrowing and transverse mode selection are performed in the oscillator, or in the passive region between oscillator and amplifier. Any resulting reduction in power may be restored by passing the oscillator output through a power amplifier.

SUMMARY

The present invention utilizes a pulsed laser to pump an oscillator dye cell which is located within an optical cavity comprising a grating in a Littrow configuration and a mirror. The grating narrows the oscillating spectral line width of the laser light energy from the oscillator dye cell. One or more Fabry-Perot Etalons are located within the optical cavity to perform further spectral narrowing. A second pulsed laser pumps an amplifier dye cell which is not surrounded by any optical cavity. The output of the oscillator dye cell is focused into the amplifier cell. When the two pulsed lasers are synchronized, the pulse of photons from the oscillator dye cell enter the amplifier dye cell simultaneously with the pumping pulses from the second laser. Thus, the photon output of the amplifier will be spatially and spectrally coherent with the oscillator output while providing increased power and brightness.

It is one object of the invention, therefore, to provide an improved N₂ pumped tunable dye laser apparatus having a photon output that is spatially coherent with respect to the input source.

It is another object of the invention to provide an improved N₂ pumped tunable dye laser apparatus having increased power and brightness.

It is yet another object of the invention to provide an improved N₂ pumped tunable dye laser apparatus having a photon output that is spectrally coherent with respect to the pumping laser.

These and other advantages, features and objects of the invention will become more apparent from the following description taken in connection with the illustrative embodiment in the accompanying drawing wherein the FIGURE is a schematic arrangement of an oscillator-amplifier N₂ pumped dye laser apparatus in accordance with this invention.

DESCRIPTION OF THE PREFERRED EMBODIMENT

Referring now to the FIGURE, there is shown a schematic arrangement of an oscillator-amplifier N₂ pumped dye laser apparatus utilizing a pair of pulsed N₂ laser devices 10, 12. The pulsed N₂ laser 10 operating at 3371 A pumps an oscillator dye cell 20 which is located within an optical cavity. The optical cavity comprises a grating 14 in a Littrow configuration and a mirror 16. The mirror 16 is a partially transmitting mirror at the frequency of interest. The grating 14 is utilized to narrow the oscillating spectral line width of the laser light energy from the oscillator dye cell 20. One or more Fabry-Perot etalons 18 are located within the optical cavity to provide further spectral narrowing. The etalon 18 is mounted on a piezo-electric crystal to provide electronic tuning control. One or more apertures may be located within the cavity to perform transverse (spatial) mode selection. The output of the oscillator dye cell 20 is taken from one of the orders of the grating 14, or from the mirror 16 which may be partially transmitting, or may be diffraction coupled around the rim of the mirror if an unstable resonator is used. For sufficiently high gain systems, the output mirror 16 may be dispensed with entirely and one end of the dye cell output used directly. In the present system, the oscillator dye cell output is taken from the partially transmitting mirror 16.

The output of the oscillator dye cell 20 may be processed further both spacially and spectrally external to the cavity. The photon output from dye cell 20 may be passed through a lens-pinhole arrangement (spatial filter) in order to obtain improved spatial coherence at the expense of power, and it may be passed through a monochromator or etalon to select only a narrow band of wavelengths, but again at the expense of power.

A second pulsed N₂ laser 12 now pumps an amplifier dye cell 22. This cell is so arranged that the output from the oscillator dye cell 20 is focused into the amplifier cell 22 by the transfer-optics unit 50. The amplifier cell 22 is not surrounded by any optical cavity. The cell walls must be tilted or suitably anti-reflection coated to prevent the cell walls from forming an optical cavity. If the two pulsed N₂ lasers 10, 12 are suitable synchronized, the pulse of photons which is generated in the oscillator dye cell 20 arrive at the amplifier dye cell 22 at the time it is being pumped by the pulse from its N₂ laser 12. In his manner, the amplifier cell 22 will reproduce the photons coming from the oscillator dye cell 20, both in frequency and in transverse phase. Also, the amplified output will be as spatially and spectrally coherent as the oscillator, but with increased power and a corresponding increase in brightness.

All of the above conditions give high peak brightness per pulse. It is frequently desirable to achieve high average brightness. This may be obtained by increasing the repetition rate and the energy per pulse. When a high data rate is required, it also may be obtained by increasing the repetition rate, specially designed fast-flow cells must be utilized to flow the dye rapidly through the optical cavity in a laminar (nonturbulent) manner, thereby maintaining the optical homogeneity of the medium from pulse to pulse. The flow systems which are used are shown schematically in FIG. 1 having dyes cooling reservoirs 24, 26, and pumps 28, 29 to pump the dye to dye cells 20, 22. Increasing the energy per pulse can only be accomplished by selecting a dye with a high conversion efficiency at the wavelength of interest. The conversion efficiency of various dyes varies with the dye chosen and the wavelength of operation of the oscillator dye cell. Some dyes have demonstrated a 30 percent energy conversion efficiency of the N₂ laser pulse.

The synchronization of the two pumping lasers 10, 12 is required for controlled system operation. Each laser has a highly repeatable, but different characteristic delay after the application of a trigger pulse of about 600 nanoseconds. The synchronizing electronics unit 32 which is shown in the Figure generates two trigger pulses, one to fire each laser. The difference in time between the two trigger pulses must be controlled accurately to within a nanosecond in order to correct for the time of flight of the photons from the oscillator to the amplifier. A wavelength comparison system 34 is utilized to maintain the operating wavelength of the N₂ pumped tunable dye laser apparatus. A portion of the output signal is directed by beam splitter 38 to sensor 39 and then to wavelength servo unit 40. A reference wavelength is supplied from a reference lamp 36 through sensor 41 to wavelength servo unit 40 which compares the two wavelengths. An output signal from the wavelength servo system 40 is applied to the piezoelectrically controlled etalon 18. The servo system output signal is proportional to the difference between the laser output signal and the reference signal. The piezoelectrically controlled etalon 18 is adjusted in response to the wavelength servo system output signal and thereby maintains the output of the oscillator dye cell 20 at the desired output wavelength.

The pulsed N₂ laser apparatus oscillating at 3371 A. is a very convenient means for pumping dyes. Commercial N₂ laser devices, such as the Avco C-950, which may be utilized in the present invention are capable of outputs of 100 KW of peak power at 100 pps. Using this laser device as a pump, a peak power of 50 kW and an average power of 1 to 50 milliwatts at wavelengths which range from 3,500 to 9,000 A. may be obtained. However, like all dye lasers the spectral and spatial coherence are poor if only a simple optical cavity for the dye is utilized. Since the N₂ pulsed laser devices are capable of high gain operation, the spectral brightness may be improved by the use of the gratings and inter-cavity etalons. However, these devices introduce losses which decrease the available power. Compensation for the power loss is achieved by utilizing as amplifier a second N₂ pulsed laser pumping a dye cell.

Although the invention has been described with reference to a particular embodiment, it will be understood to those skilled in the art that the invention is capable of a variety of alternative embodiments within the spirit and scope of the appended claims.

I claim:

1. A pulsed N₂ pumped tunable dye laser apparatus comprising in combination:
   a first pulsed N₂ laser providing a first laser signal,
   an oscillator dye cell receiving said first laser signal, said oscillator dye cell generating an oscillating laser signal,
   a second pulsed N₂ laser providing a second laser signal
   an amplifier dye cell receiving said second laser signal, said oscillating laser signal being focused into said amplifier dye cell by a transfer optics unit, said amplifier dye cell amplifying said oscillating signal and providing an output laser signal,
   a synchronization electronics unit is connected to said first and second pulsed N₂ lasers respectively, said synchronization electronics unit pulses said first and second pulsed N₂ lasers at a predetermined time with respect to each other, said predetermined time corrects for the time of flight between said oscillator dye cell and said amplifier cell, and
   a wavelength comparison unit receiving a portion of said output laser signal to maintain said oscillator dyecell at a predetermined wavelength, said wavelength comparison unit providing a control signal to said oscillator dye cell.

2. A pulsed N₂ pumped tunable laser apparatus as described in claim 1 wherein said oscillator dye cell comprises in combination:
   a dye cell containing a dye, said dye being supplied by a dye cooling reservoir, a pump connected between said dye and said dye cooling reservoir to pump said dye through said dye cell, a dye return tube being connected between said dye cell and said dye cooling reservoir, and
   an optical cavity having a first and second end enclosing said dye cell, said optical cavity comprising a grating and a mirror, said grating being positioned at said first end in a Littrow configuration, said mirror being positioned at said second end, said mirror being partially transmitting at the wavelength of interest.

3. A pulsed $N_2$ pumped tunable laser apparatus as described in claim 2 wherein said optical cavity further includes an etalon, said etalon being mounted on a piezo-electric crystal, said etalon being positioned at said first end, said piezo-electric crystal being responsive to said control signal from said wavelength comparison unit and maintaining said etalon in a position in response thereto.

* * * * *